US012373569B2

(12) United States Patent
Sayyed et al.

(10) Patent No.: US 12,373,569 B2
(45) Date of Patent: Jul. 29, 2025

(54) PRE-OPERATING SYSTEM EMBEDDED CONTROLLER HARDENING BASED ON OPERATING SYSTEM SECURITY AWARENESS

(71) Applicant: Dell Products L.P., Round Rock, TX (US)

(72) Inventors: Ibrahim Sayyed, Georgetown, TX (US); Adolfo Montero, Pflugerville, TX (US); Laxmi Medicherla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 17/868,543

(22) Filed: Jul. 19, 2022

(65) Prior Publication Data
US 2024/0028739 A1 Jan. 25, 2024

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01); *G06F 21/572* (2013.01)

(58) Field of Classification Search
None
See application file for complete search history.

(56) References Cited

U.S. PATENT DOCUMENTS

| | | | |
|---|---|---|---|
| 6,748,544 B1 * | 6/2004 | Challener | G06F 21/34 709/224 |
| 9,880,908 B2 * | 1/2018 | Jeansonne | G06F 3/0619 |
| 10,091,112 B1 * | 10/2018 | Sharma | H04L 49/3009 |
| 10,289,832 B2 * | 5/2019 | Page | G06F 21/74 |
| 10,949,540 B2 | 3/2021 | Andrews et al. | |
| 11,113,403 B2 * | 9/2021 | Sella | G06F 18/22 |
| 11,169,818 B2 | 11/2021 | Suryanarayana et al. | |
| 11,347,856 B2 | 5/2022 | Sayyed et al. | |
| 2004/0078591 A1 * | 4/2004 | Teixeira | H04L 63/0227 709/225 |
| 2008/0276059 A1 * | 11/2008 | Horiuchi | G06F 21/80 711/E12.091 |
| 2012/0179802 A1 * | 7/2012 | Narasimhan | H04W 4/50 709/223 |
| 2014/0230078 A1 * | 8/2014 | Graham | G06F 21/60 726/30 |
| 2016/0316005 A1 * | 10/2016 | Thirumurthi | H04L 67/1023 |
| 2016/0328555 A1 * | 11/2016 | Page | G06F 21/566 |
| 2021/0034756 A1 * | 2/2021 | Vichare | G06F 21/57 |

(Continued)

FOREIGN PATENT DOCUMENTS

WO WO-2018190846 A1 * 10/2018 .......... G06F 11/0751

*Primary Examiner* — Kaveh Abrishamkar
(74) *Attorney, Agent, or Firm* — Larson Newman, LLP

(57) ABSTRACT

An information handling system includes an embedded controller and a memory device storing code that when executed causes the embedded controller to perform operations that includes receiving a request to change a security setting, determining a security policy associated with the security setting, and determining whether the change to the security setting deviates from the security policy. In addition, the embedded controller in response to determining that the change to the security setting deviates from the security policy, denying the request and reverting the change to the security setting.

20 Claims, 4 Drawing Sheets

(56) References Cited

U.S. PATENT DOCUMENTS

2021/0240567 A1 8/2021 Hsu et al.
2022/0156378 A1* 5/2022 Eguchi .................... G06F 21/51
2022/0391545 A1* 12/2022 Stewart ................. G06F 3/0623

* cited by examiner

PRE-OPERATING SYSTEM EMBEDDED CONTROLLER HARDENING BASED ON OPERATING SYSTEM SECURITY AWARENESS

FIELD OF THE DISCLOSURE

The present disclosure generally relates to information handling systems, and more particularly relates to pre-operating system embedded controller hardening based on operating system security awareness.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an embedded controller and a memory device storing code that when executed causes the embedded controller to perform operations that includes receiving a request to change a security setting, determining a security policy associated with the security setting, and determining whether the change to the security setting deviates from the security policy. In addition, the embedded controller in response to determining that the change to the security setting deviates from the security policy, denying the request and reverting the change to the security setting.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
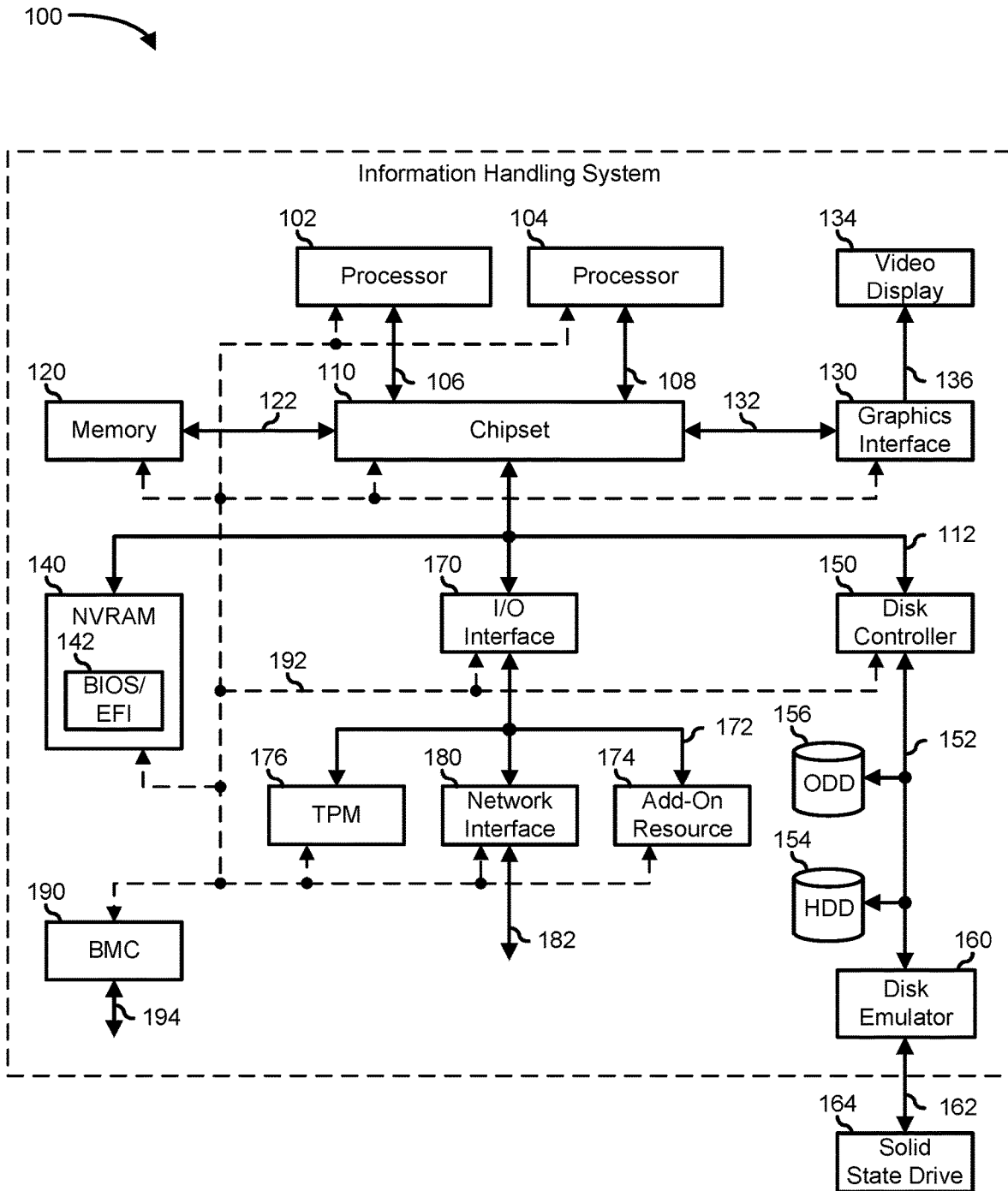
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller or service processor. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Unified extensible firmware interface (UEFI) rootkit attacks are on the rise, with intruders exploring the possible paths to introduce malware before the system boots to the host operating system. Currently, information handling systems are protected with trusted platform module (TPM)-based boot measurements and secure boot image verification. However, these TPM-based measurements can be turned off at the pre-operating system level if the attacker has physical access to the machine. The TPM-based measurements can also be turned off if the user clicks on a malware program running in elevated privilege that pushes updated BIOS attributes turning off the secure BIOS safeguards. Thus, it is advantageous to develop malware defenses at the pre-operating system level that can secure the configuration of the information handling system and lock down system update paths.

Security awareness at the pre-operating system layer hardens information handling systems through stronger defensive strategies. Accordingly it is desirable to push the correct host operating system security context while the information handling system is up and running from the bare metal or pre-operating system layer to restrict access to operating system and pre-operating system security features, such as memory integrity, secure boot, core isolation, and the like, to prevent unauthorized changes. If malware or a user downgrades the setting of one or more of these security features, then the information handling system may be vulnerable to an attack at the "below-operating system" level. For example if the malware is able to turn off the memory integrity setting, or if a user has unknowingly turned off the memory integrity setting, then the malware can access high-security processes. To address these and other concerns, the present disclosure includes a system and method that uses the host-operating system security awareness data to restrict access to security features at the pre-operating system securing the configuration of the information handling system and locking down system update paths among other actions.

Figure 2:
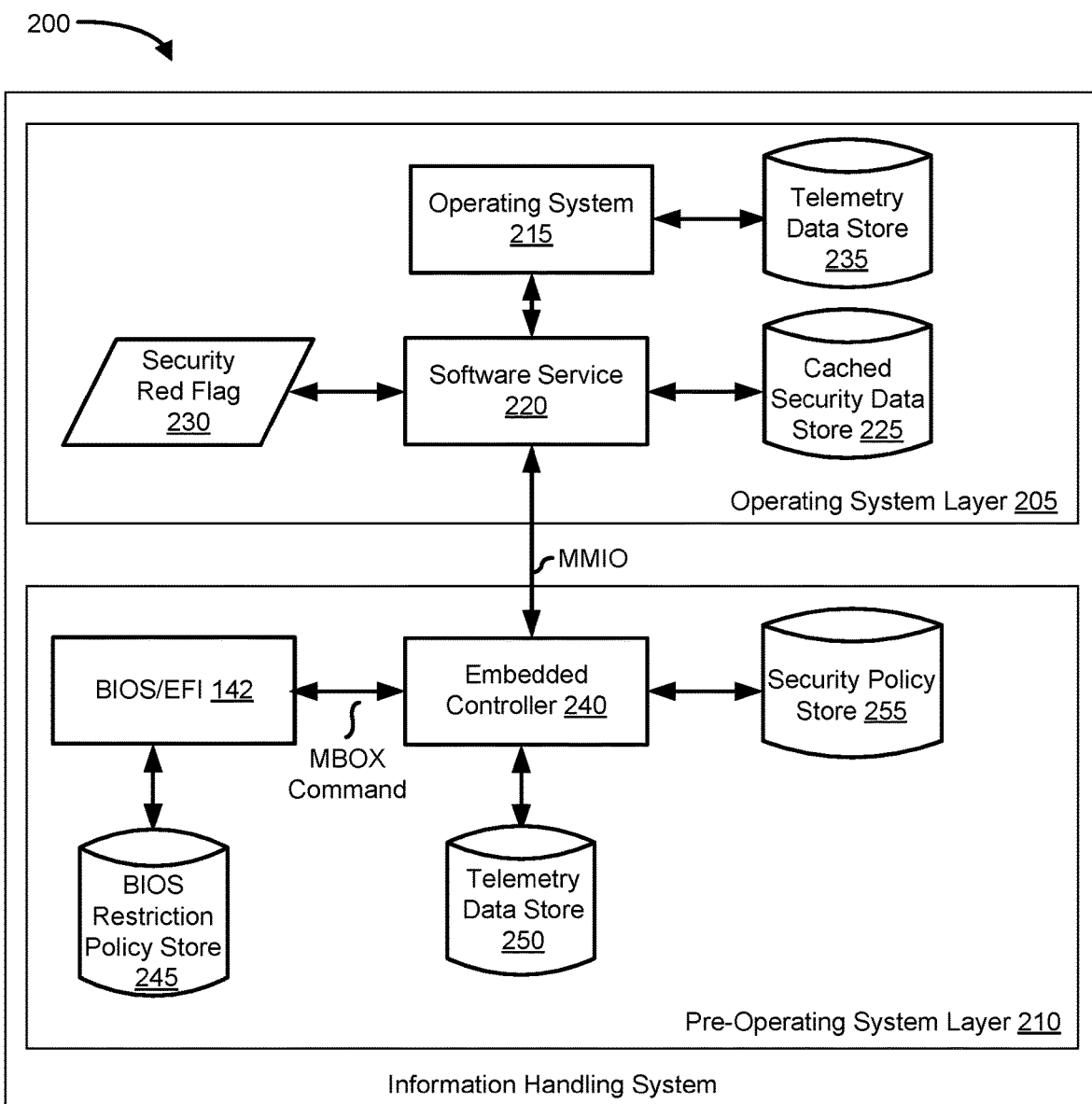
FIG. 2 is a block diagram illustrating an information handling system for pre-operating system embedded controller hardening based on operating system security awareness, according to an embodiment of the present disclosure.

FIG. 2 shows an information handling system 200 configured for pre-operating system embedded controller hardening based on operating system security awareness. Information handling system 200 includes an operating system layer 205 and a pre-operating system layer 210. Operating system layer 205 includes an operating system 215, a software service 220, a cached security data store 225, security red flags 230, and a telemetry data store 235. Pre-operating system layer 210 includes BIOS/EFI 142, an embedded controller 240, a BIOS restriction policy store 245, a telemetry data store 250, and a security policy store 255.

Information handling system 200 may be a managed device as part of a device management system by an information technology device management (ITDM) server. The ITDM server enables the provisioning or deployment of security policies to managed devices. Security policies may be stored in the cloud and accessible by embedded controller 240 and/or software service 220. The security policies may be corporate security policies with preferred security settings. The security policies may be provisioned into embedded controller 240 by an ITDM server. In addition, the security policies may be re-provisioned to apply updates to the security policies. In another embodiment, the security policies may be maintained in the cloud and accessible by embedded controller 240 via a network interface.

The security policies may include one or more rules associated with the security management of information handling system 200. The rules may be applied against one or more attributes associated with a security setting. Each rule may include a rule type, a condition, a priority or risk level, and an action. A rule type may specify whether the rule applies to the BIOS security settings, OEM hardware settings, ITDM security settings, etc. When applying the rule, if a condition is satisfied, then an associated action may be performed. The action may be performed to mitigate a security vulnerability associated with a security setting.

The priority or risk level may be based on the impact to the information handling system of the security feature if disabled. For example, the priority or risk level may be critical, sensitive, high, or low. An action may include securing pre-operating system functions, such as restrict runtime service calls to perform write operations, restrict configuration change access, and restrict BIOS critical setting changes or unauthorized system updates. For example, a request to change a value associated with a security setting may be authorized, such as, a request to enable loading of test signed drivers may be authorized on developer information handling systems. Accordingly, if the condition is not satisfied, then another action may be performed. For example, a request to change a value associated with a security setting may be blocked. In a particular example, a request to disable memory integrity may be denied. In addition, the memory integrity security setting may be re-enabled if disabled.

The rules may be satisfied in the alternative, in conjunction with, or by applying a more complex logical test. In some embodiment, a security policy may include temporal specifications to indicate when the policy should be enforced. In another embodiment, the security policy may include one or more enabling or disabling trigger events, such as changing a setting of a security policy, malware detection, etc. When a security policy is applicable, embedded controller 240 and/or software service 220 may be required to apply the security policy and perform an action based on the security policy.

Software service 220 may be configured to execute at a processor during runtime while the information handling system is under the control of operating system 215 and to handle business applications requests to read/write data to components below the OS level, such as pre-operating system layer 210. In addition, software service 220 may work with BIOS/EFI 142 and embedded controller 240 to monitor the security state of operating system layer 205 and pre-operating system layer 210. Monitoring the security state may include identifying the current security settings and determining whether the security level accordingly. For example, if all the preferred security settings based on the corporate security policies are followed, then the information handling system may be deemed highly secure or in a healthy state. Otherwise, the information handling system may be assessed with a moderate or low security level. If the security level is at or below a particular threshold, such as when the security level is low or in a healthy state, the current security settings may be examined and preferred security settings restored.

In another example, while operating system 215 may measure service processes to ensure integrity, software service 220 may be configured to monitor the security settings of operating system 215 and runtime security settings of BIOS/EFI 142, wherein software service 220 may communicate with embedded controller 240 regarding a proposed change to a security setting before applying the change. A deviation or violation of the corporate preferred security setting may result in a denial of the proposed change.

A security setting may correspond to a security attribute of an information handling system to help protect the information handling system from malicious attacks. The security settings may include BIOS security settings, operating system security settings, ITDM or corporate security settings, hardware security settings by the OEM, and the like. A security setting may be associated with at least one security policy. The security setting may have a default value and/or a preferred value set by a local administrator and/or based on a corporate security policy, such as the ITDM security settings. For example, software service 220 with BIOS/EFI 142 and embedded controller 240 may examine the operating system security settings to determine whether they adhere to or deviate from the security policies, such as whether the host operating system is running with test signing enabled, the UEFI memory allocation table is enabled, whether processor security settings are turned off, whether any other ITDM security setting is enabled, etc.

When one or more of the security settings of information handling system 200 are changed, software service 220 may check the security settings against a security policy. If the change to a security setting deviates from the requirement of the security policy, then the change may be reverted, and the security setting is restored to the previous value. Software service 220 may exchange information associated with the change in the security settings with embedded controller 240 through a secured memory-mapped input/output (MMIO). Embedded controller 240 may use the secure MMIO instead of system management interrupt (SMI) to avoid SMI latencies.

Operating system 215 and BIOS/EFI 142 provide built-in security features to help protect information handling system 200 from security attacks. For example, the security feature core isolation protects against malware by isolating computer processes from the operating system. If the current security setting deviates from corporate preferred security settings, a security red flag, such as a security red flag 230, may be raised. For example, a security red flag may be raised when the core isolation is disabled.

As disclosed herein, embedded controller 240, which is similar to BMC 190 of FIG. 2, may represent a processing device that provides various management functions for information handling system 200. For example, embedded controller 240 may be responsible for power management, cooling management, enforcing the security policies, and the like. A security policy may be an ITDM corporate security policy or an OEM hardware security policy for a device or component of the information handling system. Embedded controller 240 may be configured, with BIOS/EFI 142 and/or software service 220, to restore the security settings to preferred values when the current value of the security settings deviates from the requirement of the system-level security policy settings. After restoring the security settings, embedded controller 240 may also log the event at telemetry data store 250. The event may not be logged if it is authorized.

The security policies may be stored in security policy store 255 accessible by embedded controller 240. Security policies related to BIOS/EFI 142 security settings may be stored in BIOS restriction policy store 245 while ITDM security policies may be stored in security policy store 255. Security policy store 255 and BIOS restriction policy store 245 may be located locally information handling system, such as in an SPI flash memory device, an NVRAM, or similar. In another embodiment, security policy store 255 may be located remotely and accessible by embedded controller 240 via a network interface. In yet another embodiment, the security policies may be hardcoded with embedded controller 240. In addition, the security policies stored in security policy store 255 may be replicated in cached security data store 225. Updates to a security policy in security policy store 255 may be synchronized with a corresponding security policy in cached security data store 225. The data stores may include persistent data storage devices, such as solid-state disks, hard disk drives, magnetic tape libraries, optical disk drives, magneto-optical disk drives, compact disk drives, compact disk arrays, disk array controllers, and/or any computer-readable medium operable to store data.

Embedded controller 240 may also be provisioned with the security policies via an SPI flash. The provisioning is a process of authenticating embedded controller 240 and storing the security policies in a secure storage accessible by embedded controller 240. For example the security policies may be hardcoded in the SPI flash memory or an NVRAM, such as NVRAM 140 of FIG. 1. When one or more of the hosts and/or operating security settings are changed, software service 220 may check with embedded controller 240 and/or BIOS/EFI 142 on whether the change is according to or deviates from the security policy. If the change to the security setting deviates from the requirement of the system-level security policy settings, then the change may be reverted, and the security setting is restored to the previous value. Security policy, settings, and information may be exchanged between software service 220 and embedded controller 240 through a secure MMIO command, while embedded controller 240 and BIOS/EFI 142 may communicate through an mbox command.

The security policy can restrict access to security settings. For example, the security policies may restrict access to one or more sensitive operating system/BIOS runtime security settings by greying out the security feature. The security policy can also determine whether the change to the security setting is authorized. When a write operation request comes from the host or operating system through either software service 220 or an application communication channel, embedded controller 240 may verify the authorization of the write operation request prior to performing the write operation. If the write operation request is unauthorized, then embedded controller 240 may block the write operation request. If the write operation was authorized, but the change to the security setting deviates from the requirement of the system-level security policy settings, then embedded controller 240 may revert the change and the security setting is restored to the previous value. In addition, embedded controller 240 may restrict access to locked controller devices.

On reboot of information handling system 200, embedded controller 240 may send the values of the security settings to BIOS/EFI 142 during the pre-EFI initialization phase. The values of the security settings may be stored in a hand-off block to pass information to one or more drivers of the driver execution environment (DXE) phase. When there is a deviation from boot settings and/or properties that landed in a BIOS setup screen, a user interface from the browser restricts or limits access to one or more security settings in the BIOS setup screen according to one or more security policies provided by embedded controller 240. For example, the user interface form browser may grey out one or more security settings or block out one or more BIOS setup pages.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

Figure 3:
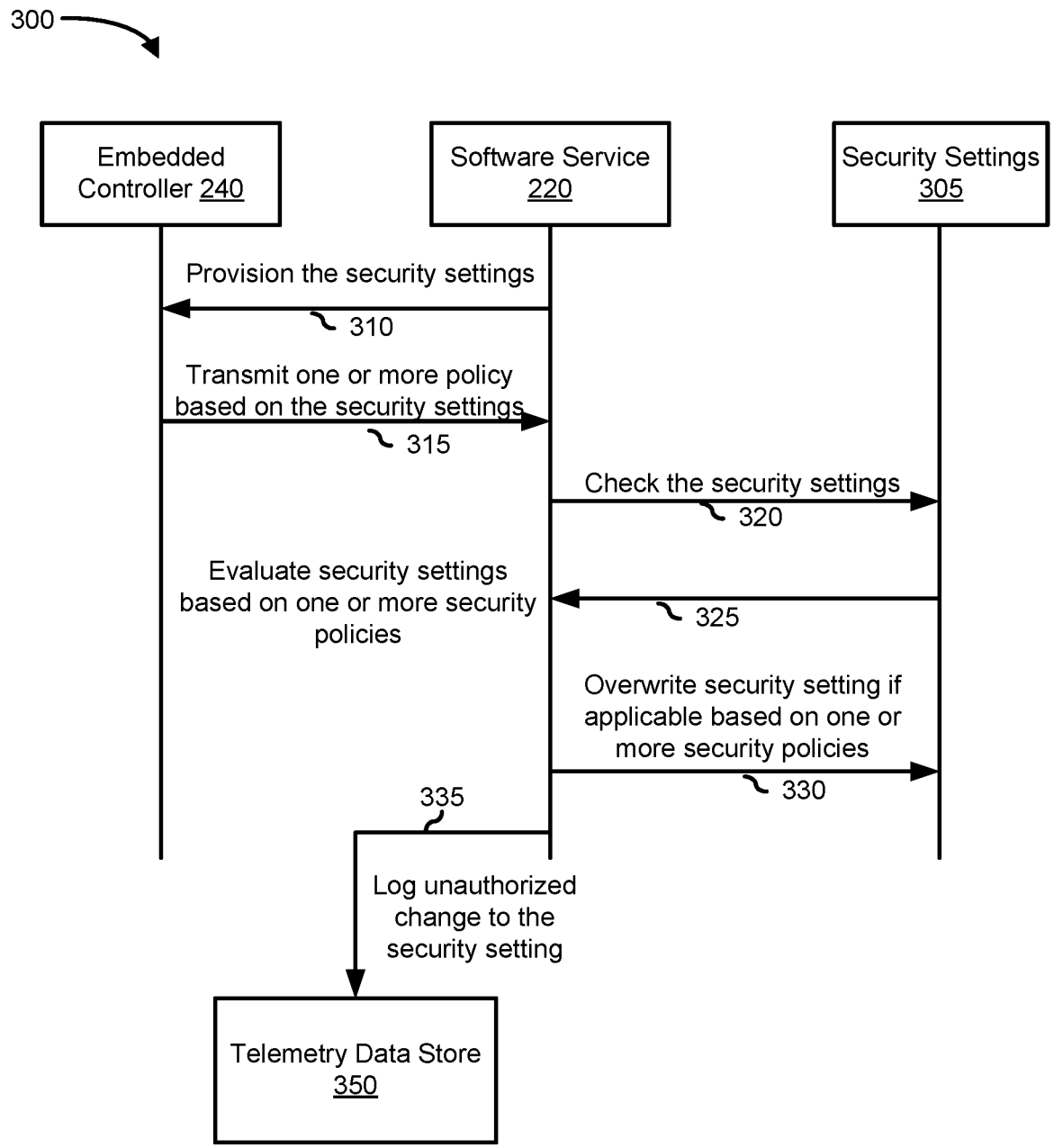
FIG. 3 is a flowchart illustrating a method for pre-operating system embedded controller hardening based on operating system security awareness, according to an embodiment of the present disclosure.

FIG. 3 shows a flowchart of a method 300 for pre-operating system embedded controller hardening based on operating system security awareness. Method 300 may be performed by one or more components of information handling system 200 of FIG. 2, such as embedded controller 240 and software service 220. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

In this example, a user may be in the process of changing one or more security settings, such as security settings 305, in an information handling system via a user interface. Prior to applying the change, software service 220 may with embedded controller 240 determine whether the proposed change to the security setting adheres to, deviates from, or violates the requirements of one or more security policies. If the proposed change adheres to the security policies, then the change is authorized. If the proposed change to the security settings deviates from or violates a security policy, then the change may be denied. If the proposed change has been applied, the security setting may be restored or rolled back to the preferred values. Accordingly, an event may be logged, when a proposed change to the security setting is denied and/or the security setting is reverted to a preferred value. For example, an event associated with a change to an operating system security setting may be logged at telemetry data store 235 and/or telemetry data store 250 while a change to security setting associated with BIOS/EFI 142 may be logged at telemetry data store 250.

Method 300 typically starts at operation 310 when software service provisions security settings 305 into embedded controller 240, such as providing embedded controller 240 with access to security settings 305. Based on the security settings, embedded controller 240 may determine one or more security policies and transmit the security policies to software settings at operation 315. In one example, security settings 305 may be an operating system security setting, such as a secure boot setting.

Upon receipt of the security policies, at operation 320, software service 220 may check security settings 305 and determine its associated value(s). At operation 325, software service 220 may evaluate security settings 305 to determine whether security settings 305 satisfy conditions of the one or more security policies received from embedded controller 240. If security settings 305 do not satisfy the conditions of one or more security policies, then software service 220 may overwrite the current value of security settings 305 with the previous value of security settings 305 at operation 330. At operation 335, software service 220 may also log the unauthorized change to security settings 305 at telemetry data store 350.

Figure 4:
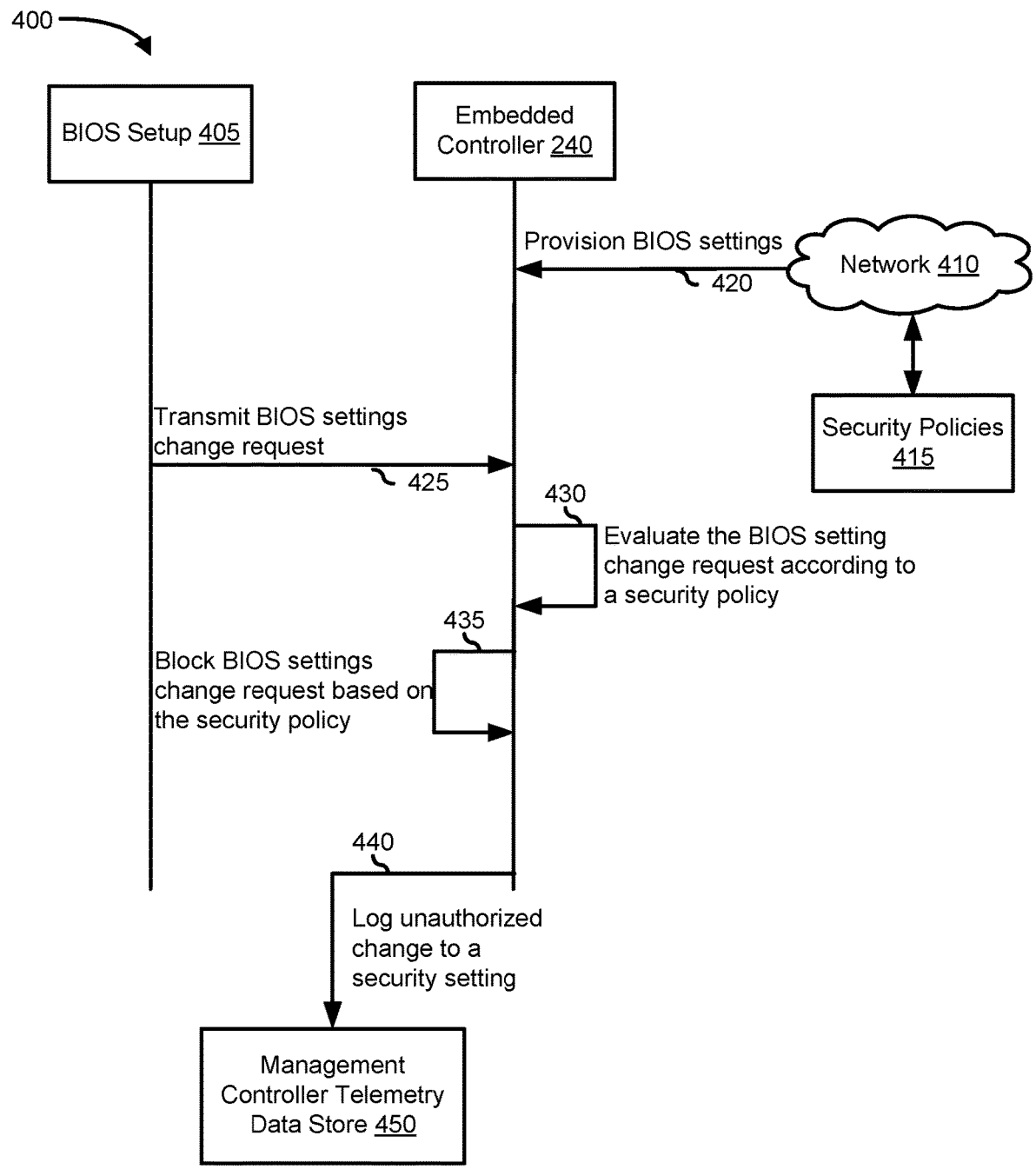
FIG. 4 is a flowchart illustrating a method for pre-operating system embedded controller hardening based on operating system security awareness, according to an embodiment of the present disclosure.

FIG. 4 shows a flowchart of a method 400 for pre-operating system embedded controller hardening based on operating system security awareness. Method 400 may be performed by one or more components of information handling system 200 of FIG. 2, such as embedded controller 240. While embodiments of the present disclosure are described in terms of information handling system 200 of FIG. 2, it should be recognized that other systems may be utilized to perform the described method. One of skill in the art will appreciate that this flowchart explains a typical example, which can be extended to advanced applications or services in practice.

In this example, a user changes one or more BIOS settings via a BIOS setup 405. Based on one or more security policies, an embedded controller may authorize the change to the BIOS setting. The embedded controller may also block the change to the BIOS setting based on the security policy, as depicted herein. Method 400 typically starts at operation 420 where BIOS settings, such as ITDM BIOS settings, may be provisioned into embedded controller 240. Provisioning allows embedded controller 240 access to the BIOS settings in security policies 415 via network 410. In certain embodiments, network 410 may be a public network, such as the Internet, a physical private network, a wireless network, a virtual private network, or any combination thereof.

At operation 425, BIOS setup 405 may transmit a BIOS setting change request to embedded controller 240. The change request may be based on a change request by a user in BIOS setup 405. At operation 430, embedded controller 240 may evaluate the BIOS setting change request based on one or more security policies, such as security policies 415. At operation 435, embedded controller 240 may block the BIOS setting change request based on one or more security policies. For example, embedded controller 240 may block a BIOS setting change request to remove an administrator's password. Embedded controller 240 may also block a BIOS setting change request from an unauthorized user. In addition, at operation 440, embedded controller 240 may also log the unauthorized BIOS setting change request at an embedded controller telemetry data store 450.

Although FIG. 3 and FIG. 4 show example operations of method 300 and method 400 in some implementations, method 300 and method 400 may include additional operations, fewer operations, different operations, or differently arranged operations than those depicted in FIG. 3 and FIG. 4. Those skilled in the art will understand that the principles presented herein may be implemented in any suitably arranged processing system. Additionally, or alternatively, two or more of the operations of method 300 and method 400 may be performed in parallel. For example, operation 330 and operation 335 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   receiving, by an embedded controller, a request to change a security setting;
   determining a security policy associated with the security setting;
   determining whether the request to change to the security setting adheres to the security policy; and
   in response to determining that the request to change to the security setting is authorized but the change to the security setting does not adhere with the security policy, denying the request and overwriting the change to the security setting with a previous value using a secured memory-mapped input/output command.

2. The method of claim 1, further comprising in response to determining that the change to the security setting adheres to the security policy, authorizing the request and applying the change to the security setting.

3. The method of claim 1, wherein the security setting is an operating system level security setting.

4. The method of claim 1, wherein the security setting is a system basic input-output system (BIOS) security setting.

5. The method of claim 1, further comprising restricting access to a locked controller device.

6. The method of claim 1, wherein the embedded controller is provisioned with the security policy.

7. The method of claim 1, further comprising logging the request to change the security setting.

8. The method of claim 1, wherein the embedded controller is communicatively coupled to a software service via a secured memory-mapped input/output bus.

9. An information handling system, comprising:
   an embedded controller; and
   a memory device storing code that when executed causes the embedded controller to perform operations, the operations including:
   receiving, by the embedded controller, a write operation request to change an operating system level security setting;
   determining a security policy associated with the operating system level security setting;
   determining whether the change to the operating system level security setting deviates from the security policy; and
   in response to determining that the write operation request to change to the operating system level security setting deviates from the security policy, denying the write operation request and overwriting the change to the operating system level security setting with a previous value.

10. The information handling system of claim 9, the operations further comprising in response to determining that the change to the operating system level security setting adheres to the security policy, authorizing the write operation request and applying the change to the operating system level security setting.

11. The information handling system of claim 9, wherein the operating system level security setting is an operating system security setting.

12. The information handling system of claim 9, wherein the operating system level security setting is an information technology decision maker (ITDM) security setting.

13. The information handling system of claim 9, wherein the security policy is a corporate policy.

14. The information handling system of claim 9, wherein the embedded controller is provisioned with the security policy.

15. The information handling system of claim 9, wherein the embedded controller is communicatively coupled to a software service via a secured memory-mapped input/output.

16. A non-transitory computer-readable media to store instructions that are executable to perform operations, the operations comprising:
   receiving, by an embedded controller, a write operation request to change a pre-operating system level security setting;
   determining a security policy associated with the write operation request to change the pre-operating system level security setting; and
   if the write operation request to change to the pre-operating system level security setting is unauthorized, then restricting access to the pre-operating system level security setting based on the security policy.

17. The non-transitory computer-readable media of claim 16, wherein the operations further comprise if the change to the pre-operating system level security setting adheres to the security policy, then authorizing the write operation request, and applying the change to the pre-operating system level security setting.

18. The non-transitory computer-readable media of claim 16, wherein the pre-operating system level security setting is basic input/output system (BIOS) security setting.

19. The non-transitory computer-readable media of claim 16, wherein the restricting access to the pre-operating system level security setting includes greying out the pre-operating system level security setting.

20. The non-transitory computer-readable media of claim 16, wherein the pre-operating system level security setting is a hardware security setting.

* * * * *